No. 704,069. Patented July 8, 1902.
D. N. MELVIN.
MACHINE FOR THE MANUFACTURE OF INLAID LINOLEUM.
(Application filed Oct. 23, 1901.)
(No Model.) 7 Sheets—Sheet 2.

WITNESSES: Gustave Dieterich. John Kehlenbeck.

INVENTOR David Neilson Melvin
BY Chas. E. Gill ATTORNEY

No. 704,069. Patented July 8, 1902.
D. N. MELVIN.
MACHINE FOR THE MANUFACTURE OF INLAID LINOLEUM.
(Application filed Oct. 23, 1901.)
(No Model.) 7 Sheets—Sheet 4.

Fig. 6.

WITNESSES: INVENTOR
David Neilson Melvin
BY
ATTORNEY

No. 704,069. Patented July 8, 1902.
D. N. MELVIN.
MACHINE FOR THE MANUFACTURE OF INLAID LINOLEUM.
(Application filed Oct. 23, 1901.)
(No Model.) 7 Sheets—Sheet 7.

WITNESSES: Gustav Dieterich. Gunder Gunderson.

INVENTOR David Neilson Melvin
BY Chas. C. Gill
ATTORNEY

UNITED STATES PATENT OFFICE.

DAVID NEILSON MELVIN, OF LINOLEUMVILLE, NEW YORK.

MACHINE FOR THE MANUFACTURE OF INLAID LINOLEUM.

SPECIFICATION forming part of Letters Patent No. 704,069, dated July 8, 1902.

Application filed October 23, 1901. Serial No. 79,699. (No model.)

*To all whom it may concern:*

Be it known that I, DAVID NEILSON MELVIN, a subject of the King of Great Britain, and a resident of Linoleumville, in the county of Richmond and State of New York, have invented certain new and useful Improvements in Machines for Use in the Manufacture of Inlaid Linoleum Floor-Cloth, of which the following is a specification.

The invention relates to machines for use in the manufacture of inlaid linoleum floor-cloth; and it consists in the novel features, arrangements, and combinations of parts hereinafter described, and particularly pointed out in the claims.

The object of the invention is to provide means for more rapidly, expeditiously, and correctly manufacturing inlaid linoleum floor-cloth than has been possible by the machines heretofore constructed and known to me.

The present invention is more especially designed as an improvement upon the apparatus shown and described in Letters Patent of the United States No. 412,279, granted to me October 8, 1889. In accordance with the procedure described in the said Patent No. 412,279 the tesseræ or shapes of the linoleum composition in an unseasoned state were applied upon pattern or pin blocks, and these pattern or pin-blocks were then inverted upon the canvas foundation and pressure applied upon said blocks for causing the tesseræ to adhere to the canvas. Thereafter the pattern or pin blocks were manually elevated from the tesseræ then adhering to the canvas, and the tesseræ carried by the canvas were then subjected to a further operation, which consisted in applying a hot plate upon the tesseræ and subjecting the same to pressure for the purpose of completing the floor-cloth. The handling of this hot plate was a feature involving considerable time and expense, as will be apparent when it is assumed that lineoleum floor-cloth is customarily made about six feet in width. The hot plate therefore was necessarily of considerable size and weight and had to be handled with the aid of machinery and with care, besides requiring means to maintain its temperature. The press shown in said Patent No. 412,279 is equipped with a traveling ram which required to be shifted laterally, so that the hot plate might be placed over the tesseræ and then returned to position above the hot plate, which operations also consumed considerable time. The means shown and described in the said Patent No. 412,279 have been successfully used in the manufacture of very large amounts of linoleum floor-cloth, but the process of manufacturing with said means has necessarily been slow; and the purpose of the present invention is to afford means for assuring the convenient, rapid, and correct manufacture of the goods and to avoid much of the labor, time, and expense consumed in manufacturing in accordance with the apparatus shown in the said Patent No. 412,279 without departing from the processes made the subject of the claims of the said patent. In carrying out my present invention I make use of the pattern or pin blocks described in the said Patent No. 412,279 and apply upon the same the shapes or tesseræ of linoleum composition while in an adherent, spongy, or unseasoned state, the blocks then being utilized for transferring the tesseræ, arranged in the desired pattern, upon the canvas or other foundation, where they are affixed by pressure. In carrying out the invention I do not, however, employ a press having the traveling ram described in the said Patent No. 412,279, nor do I manually elevate the pattern or pin blocks from the tesseræ after the latter have been pressed upon the canvas, nor do I make use of the hot plate referred to in said Patent No. 412,279 between the platen of the press and the upper surface of the tesseræ.

The apparatus in its preferred form of my invention comprises a press whose platen equals the width of the linoleum fabric and has simply a vertical movement and through which press the foundation fabric is carried automatically. The pattern or pin blocks carrying the tesseræ are applied upon the foundation canvas on the feed-table of the said press and are carried below the said platen of the press, where they remain stationary while the platen of the press descends and affixes the tesseræ upon the canvas. The ascent of the platen of this press serves to actuate the mechanism by which the canvas with the pin-block thereon is carried from below the platen to the table at the rear of the same, where means are provided for stripping the tesseræ then adhering to the canvas from the pin or pattern block while the latter travels onward. The pin or pattern blocks constituting a part of the present apparatus have serrated edges conforming to the tesseræ and match one another, so that said pattern or pin blocks may be fed one against another upon the canvas foundation, in which respect said blocks differ from the pin or pattern blocks of said Patent No. 412,279. The canvas foundation carrying the tesseræ thence passes to the second press having a heated platen, which descends upon the tesseræ and completes the formation of the floor-cloth, the latter traveling from this press to a suitable drum mounted on a truck, by which after a roll of suitable size has been formed the same may be conveniently moved away.

Intermediate the two presses of the present apparatus is formed a well, within which a loop of the traveling canvas with the tesseræ thereon is formed, this loop preventing either press from interfering with the other press in the event of any inharmonious action in said presses.

The invention will be fully understood from the detailed description hereinafter presented, reference being had to the accompanying drawings, in which—

Figure 1:
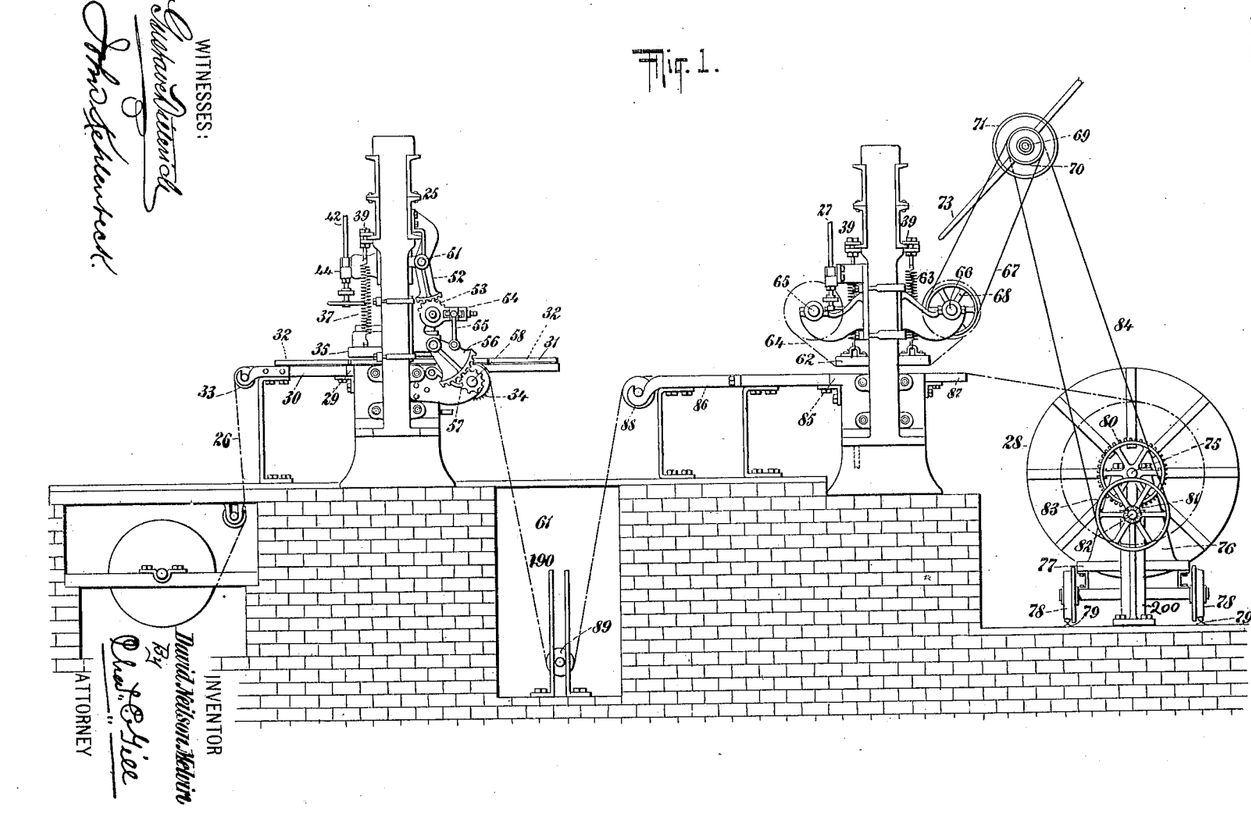
Figure 1 is a side elevation of a complete machine embodying the invention.
Figures 2, 3:
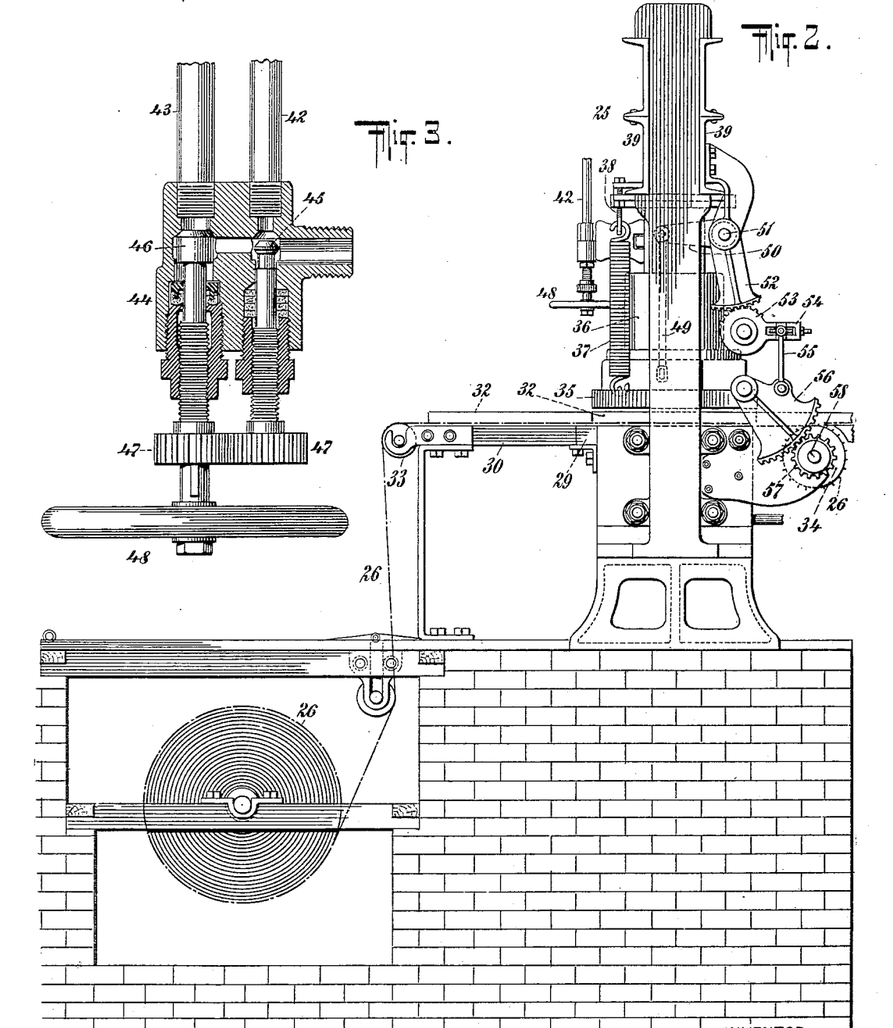
Fig. 2 is an enlarged side elevation of the first press, by which the tesseræ are pressed upon the foundation fabric.
Fig. 3 is an enlarged sectional view through a valve-casing forming a feature of the presses.

In the drawings, 25 denotes the first press, by which the tesseræ are affixed to the canvas or other foundation 26; 27, the second press, through which the foundation having the tesseræ thereon passes and which completes the floor-cloth, and 28 the drum upon which the completed floor-cloth is wound as it leaves the press 27. The press 25 is provided with a bed-plate 29, a feed-table 30 in advance of said bed-plate 29, and a table 31 in line with and in the rear of said bed-plate 29, and the tables 30 31 and bed-plate 29 form a continuous surface over which the pin-blocks 32 travel, while the canvas or other foundation fabric 26 passes simply over the feed-table 30 and bed-plate 29. At the front end of the table 30 is provided a plain roller 33, over which the canvas 26 passes, and at the rear edge of the bed-plate 29 is provided a roller 34, which has pins distributed over its surface to engage the lower surface of the canvas 26 and turn said canvas downward in the direction indicated in Fig. 1 as said canvas, with the tesseræ thereon, leaves the press 25. Above the bed-plate 29 is disposed the vertically-movable platen 35, upon which are mounted the cylinders 36 36 and which is suspended by coiled springs 37, said springs being secured at their upper ends to eyebolts 38, supported from the upper transverse beams 39, connecting the end columns of the press. The cylinders 36 receive smaller cylinders 40, into which leads the pipe 41 for the passage of the oil or other liquid to the interior of said cylinders 36 40, said pipe 41 constituting both the inlet-pipe and outlet-pipe for said oil or other liquid, which is supplied from a suitable source, under pressure, in a well-known manner. The cylinders 36 and 40 are of the usual construction and require no special mention. In the present instance, however, these cylinders are not movable laterally, and the upper cylinders 40 are secured to the beams 39, while the lower cylinders 36 are carried by the platen 35. The oil or other liquid for the cylinders 36 40 is supplied through the pipe 42 and finds an outlet through the pipe 43, which pipes are, as shown in Fig. 3, connected with a valve-casing 44, containing the valves 45 46, whose stems are connected by gear-wheels 47 and one of which is equipped with a convenient hand-wheel 48. The valves 45 46 open alternately, and when the valve 45 is open the oil or other liquid will pass from the pipe 42 through the valve-casing 44 into the pipe 41 and thence enter the cylinders 36 40, causing the cylinders 36 and platen 35 to descend and exert the requsite pressure. When it is desired to relieve the pressure exerted by the platen 35, the valve 45 will be closed, and this will result in the opening of the valve 46, at which time the springs 37 will be enabled to elevate the platen 35 and cylinders 36, and the oil or a portion thereof will be forced back through the pipe 41 and valve-casing 40 into the outlet-pipe 43, the oil on this passage moving around the groove in the stem of the valve 45. The platen 35 does not require to be heated, but the bed-plate 29 will be heated by steam.

The press 25 is equipped with means for automatically feeding the canvas 26 over the table 30 and bed-plate 29, and these means consist of the roller 34, with means intermediate said roller and the platen 35 for effecting the rotation of said roller during the upward movement of the said platen. Upon the platen 35 is secured the lower end of the pitman-rod 49, and the upper end of this rod 49 is secured to the lever-arm 50, fastened upon a crank-shaft 51, upon whose upper end is secured a segment 52, which is in engagement with the segment 53, forming a part of the lever-arm 54. The lever-arm 54 is connected by a rod 55 with the segment 56, and the latter is in engagement with a gear-wheel 57, mounted loosely upon the end of the spindle 58 of the roller 34. Upon the spindle 58 is secured a ratchet-wheel 59, and to the face of the gear-wheel 57 is secured a pawl 60, which engages said ratchet-wheel during the upward motion of the platen 35 and slips over the teeth of said ratchet during the downward motion of the platen 35. During the downward motion of the platen 35 the pitman-rod 49 will rock the shaft 51 and turn the segment 52 rearward, and this will result in the arm 54 being turned downward and through the rod 55 pushing the segment 56 downward, the latter turning the gear-wheel 57 upon the spindle 58, but effecting no movement of the said spindle 58, because at that time the pawl 60 will slip freely over the teeth of the ratchet-wheel 59. During the upward motion of the platen 35 the pitman-rod 49 will be pushed upward and turn the rock-shaft 51 to move the segment 52 inward toward the press 25, and this will result in the arm 54 and segment 56 being moved upward, said segment 56, during its motion, rotating the gear-wheel 57 and causing the pawl 60 to act upon the ratchet 59 and effect the rotation of the spindle 58 and roller 34, the roller 34 at such time pulling the canvas 26 from over the bed 29 and turning the same downward into the well 61, the latter, as shown in Fig. 1, being disposed intermediate the presses 25 and 27. The press 25 is thus equipped with automatic means for feeding the canvas 26 over its plate 29. The pins on the roller 34 will enter the interstices of the canvas 26, but will not be of sufficient length to interfere with the tesseræ applied upon said canvas.

Figures 4, 5:
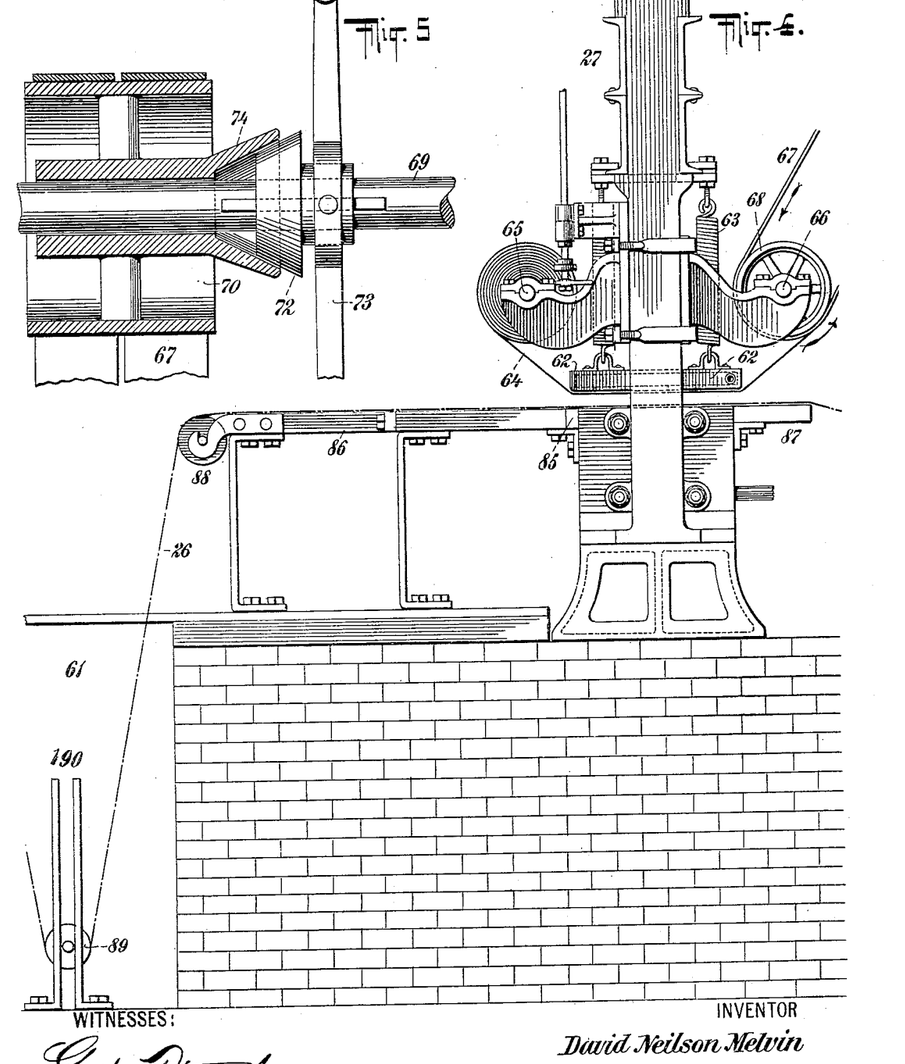
Fig. 4 is an enlarged side elevation of the second press, which completes the floor-cloth.
Fig. 5 is an enlarged sectional view of one of the belt-wheels of the machine.
Figure 8:
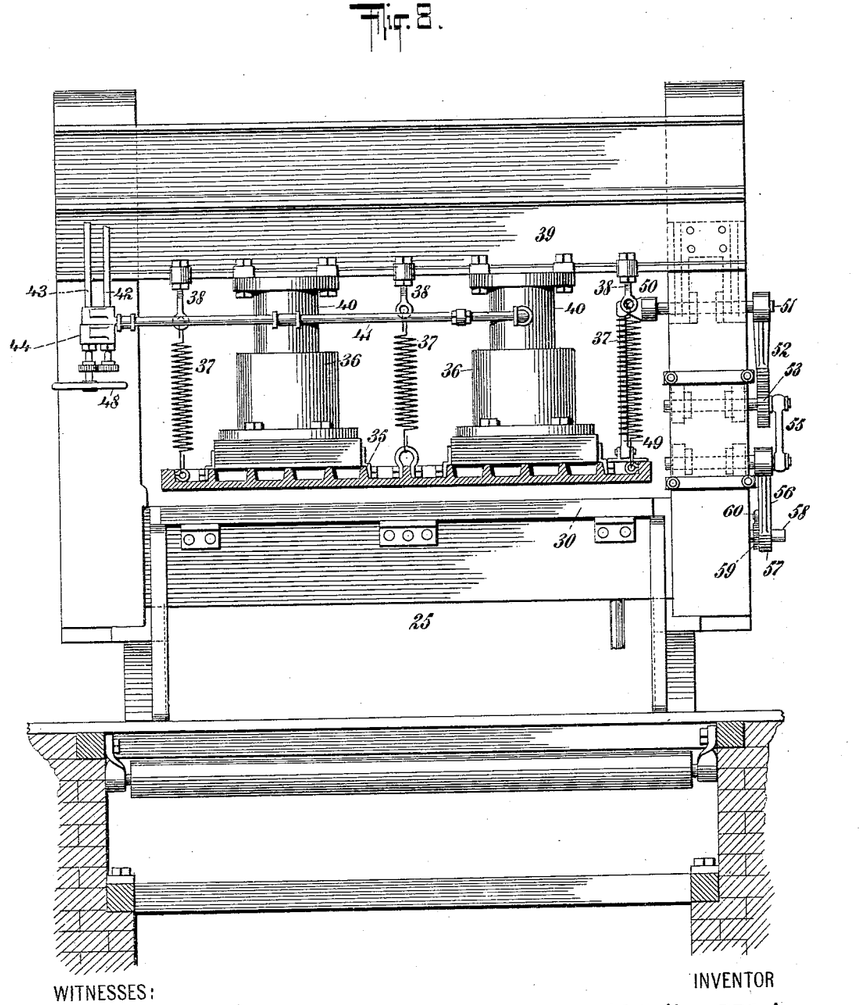
Fig. 8 is a front elevation of same.

The press 27 corresponds in all essential particulars with the press 25; but its platen 62, suspended by springs 63, will be heated, being in the nature of a steam-table, and the press 27 will lack the means (shown in Fig. 2) for feeding the canvas 26 through it. The press 27 is to effect the final pressure by which the floor-cloth is completed, and the heated platen 62 will be prevented from having direct contact with the upper surface of the tesseræ by means of a traveling apron 64, carried by said press and adapted to travel from the cylinder 65 to the cylinder 66, said apron on its passage from the cylinder or drum 65 to the cylinder or drum 66 passing below the platen 62. The apron 64 may be advantageously formed of thin oil-cloth, whose polished surface will contact with the upper surface of the tesseræ upon the canvas 26. The press 27 will be equipped with cylinders of the exact construction shown in Fig. 8. The apron 64 is given its traveling motion across the under surface of the platen 62 from a belt 67 and belt-wheel 68, the latter being connected with the cylinder or drum 66. The belt 67 derives its motion from the power-shaft 69, upon which is a belt-wheel 70 to receive said belt 67. The power-shaft 69 will derive its motion from any suitable source through the belt-wheel 71 thereon, and the belt-wheel 70 will be loosely mounted upon said shaft, so that the power of the latter may be cut off therefrom at will. In Fig. 5 I illustrate a convenient form of clutch mechanism for the belt-wheel 70, this mechanism comprising a clutch-disk 72, keyed upon the shaft 69 and adapted to be moved by means of an ordinary lever 73 into engagement with the socket 74, connected with the belt-wheel 70. When the clutch-disk 72 is in engagement with the belt-wheel 70, the latter will rotate with the shaft 69, and motion will be communicated to the belt 67 and through said belt to the cylinder or drum 66, with the effect of enabling the latter to draw a portion of the apron 64 from the cylinder or drum 65 and across the lower surface of the heated platen 62, thereby affording means for moving fresh surfaces of the apron 64 below the heated platen 62 for contact with the upper surface of the tesseræ, it not being desirable that the same section of the apron 64 shall at all times remain below the heated platen 62. After all of the apron 64 has become unwound from the drum 65 and wound upon the drum 66 it will be necessary to transpose the said drums or rewind the apron 64 back upon the drum 65.

The invention is not limited to any special means for effecting the traveling of the apron 64 from the drum 65 to the drum 66, and it is obvious that any well-known means may be adopted for this purpose.

Figure 6:
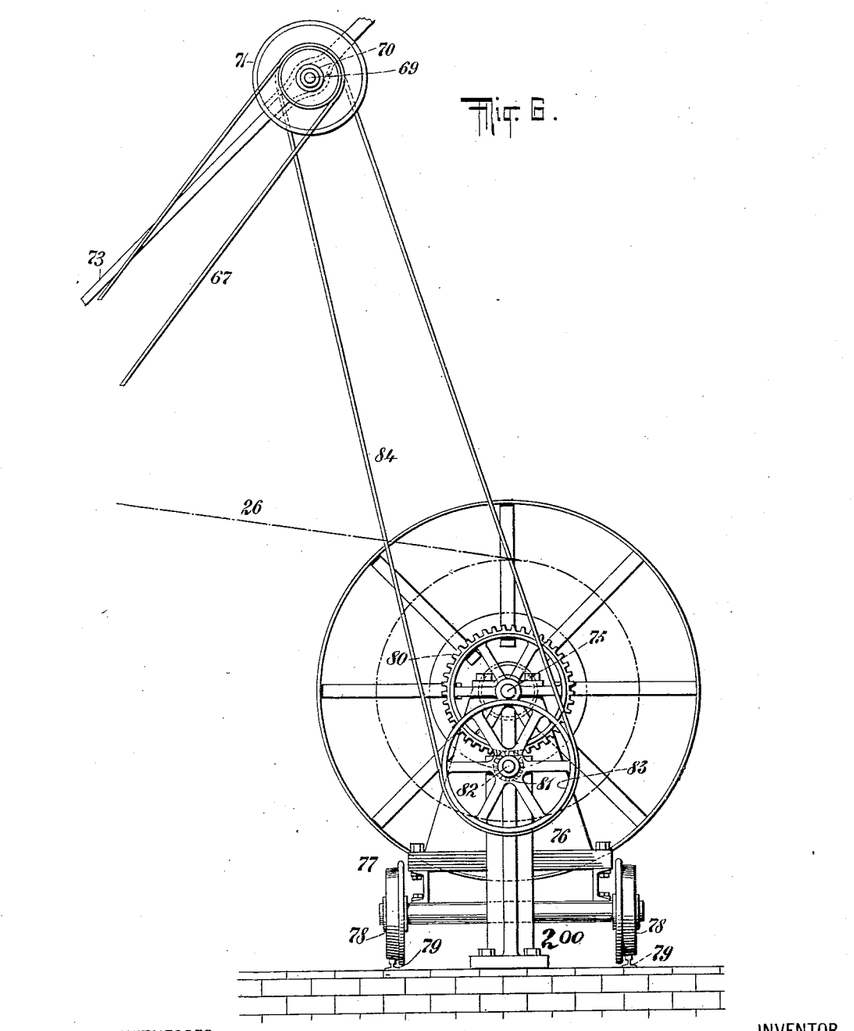
Fig. 6 is an enlarged side elevation of the means for winding up the completed floor-cloth preparatory to the removal of the roller of same.
Figure 7:
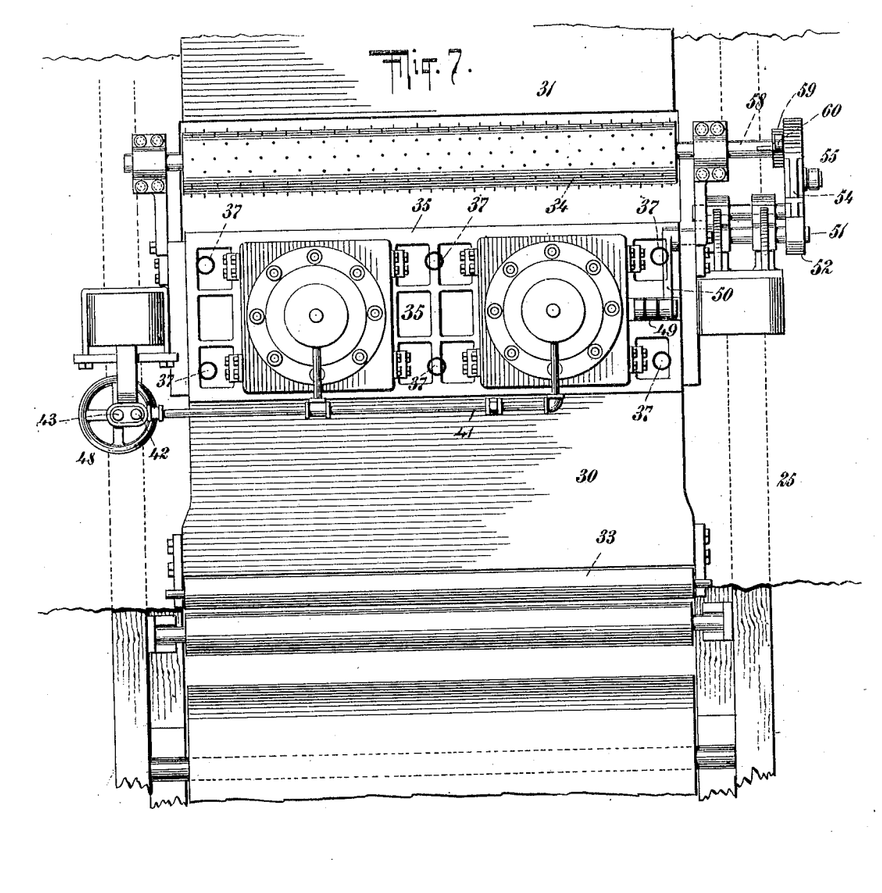
Fig. 7 is an enlarged top view of the first press.

The drum 28 for winding into a roll the finished floor-cloth will be mounted upon a shaft 75, secured in the upper ends of the standards 76, carried by a truck 77, which will be equipped with wheels 78 and mounted upon rails 79. Upon one end of the shaft 75 will be secured a gear-wheel 80, in mesh with a pinion-wheel 81, secured upon an auxiliary shaft 82, and upon the end of this auxiliary shaft 82 is secured a belt-wheel 83, which will derive its power from the main driving-shaft 69 through a belt 84. The shaft 82 is mounted in the upper end of a stationary vertical standard 200, Fig. 6, which is independent of the truck 77 and parts carried thereby. The rotation of the belt-wheel 83 and shaft 82 will cause the pinion-wheel 81, acting through the gear-wheel 80, to rotate the drum 28 and effect the winding upon the latter of the finished floor-cloth. After the finished roll of floor-cloth has been wound upon the drum 28 the belt 84 will be removed from the belt-wheel 83, and the truck 77 will then be utilized for removing said roll of floor-cloth to any convenient location. The rotation of the drum 28 serves to draw the floor-cloth over the bed-plate 85 of the press 27 and over the feeding-tables 86 and 87, connected with said press 27 and in line with the bed-plate 85 thereof. At the front edge of the table 86 is provided a plain roller 88, over which the canvas 26 passes, as shown in Fig. 1, said roller 88 being adjacent to the vertical plane of the rear wall of the well 61, while the pin-roller 34 is adjacent to the vertical plane of the front wall of said well 61. The foundation fabric 26, with the tesseræ thereon and adhering thereto, is looped within the well 61 and passes below the roller 89 therein, said roller 89 resting within the loop of the canvas 26 and having its reduced ends disposed between the vertical guides 190, secured to the base of said well 61. The roller 89 is capable of vertical movement under the direction of the guides 190 and is supported upon the fabric 26, and hence said roller 89 may rise and fall with any decrease or increase in the extent of the loop in the canvas 26, disposed within the well 61. The purpose of the roller 89 is to keep a reasonable tension upon the fabric 26, and the purpose of the looping of the fabric 26 within the well 61 is to facilitate the operation of the manufacture of the floor-cloth by the two machines 25 and 27. If the fabric 26 should pass on a straight line from the bed-plate of the press 25 to the bed-plate of the press 27, said presses would be obliged to operate in the most perfect harmony; otherwise the floor-cloth might become distorted or destroyed, especially if the press 27 should continue in operation during any temporary cessation in the feeding of the fabric 26 through the press 25. The platens 35 and 62 of the presses 25 and 27 will be operated by hand through the valve-gear shown in Fig. 3, and hence it will be obvious that the presses 25 and 27 cannot always operate in entire harmony. When, however, the well 61 is provided and a loop in the fabric 26 is formed therein, it will be an easy matter for the attendants at the two presses to successfully and rapidly carry on the manufacture of the floor-cloth without danger of either press injuriously affecting the operation of the other press or of destroying the floor-cloth.

Figure 9:
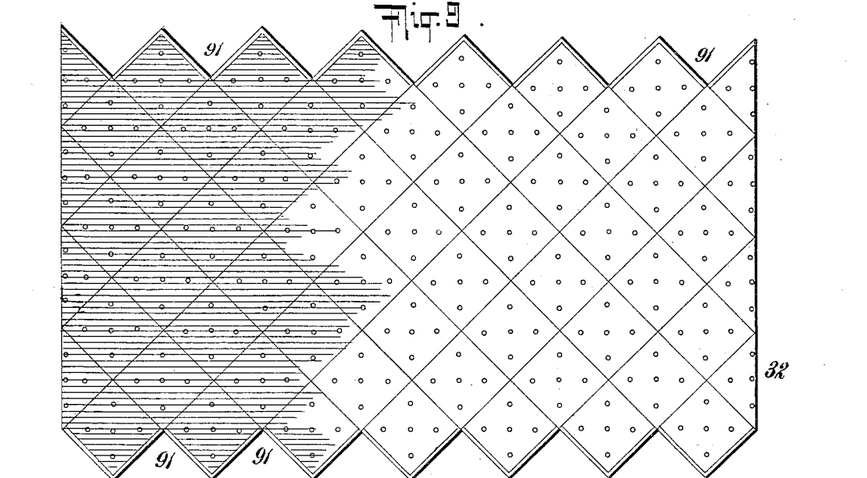
Fig. 9 is a top view of one of the pattern or pin blocks.
Figure 10:
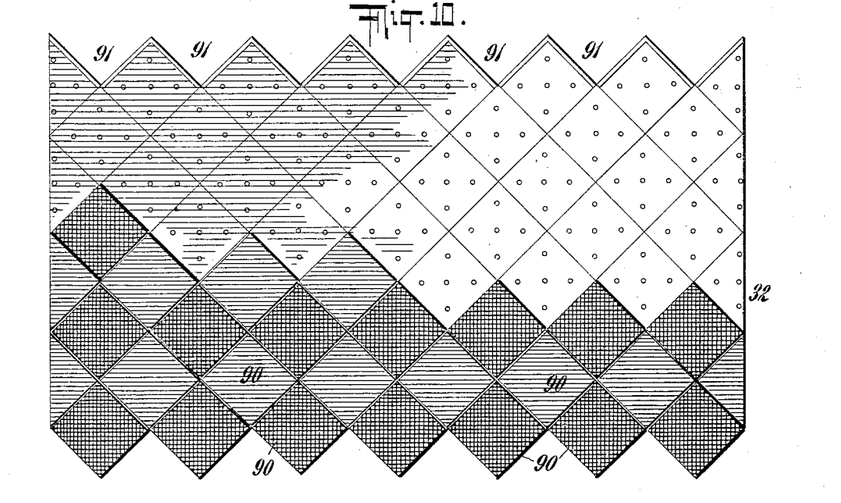
Fig. 10 is a like view of same, showing some of the tesseræ thereon.
Figure 11:
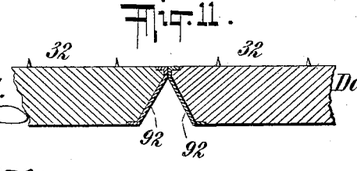
Fig. 11 is a sectional view through the adjoining portions of two of the pattern or pin blocks.

The pin or pattern blocks 32, which carry the tesserae and from which the tesserae are transferred to the canvas or other foundation fabric 26, are illustrated in Figs. 9, 10, and 11, some of the tesserae (numbered 90) being shown in position on the block in Fig. 11. The pattern or pin blocks 32 do not differ in any essential respect from the pattern or pin blocks shown in the aforesaid Patent No. 412,279, with the exception that in the present case the said blocks 32 are formed with serrated edges 91, conforming to the pattern thereon, and that said blocks are adapted to match one with the other, so that when the blocks are pushed together in edge to edge contact the blocks will present a uniform tesserae-carrying surface. This feature of the construction may be understood upon reference to Figs. 9 and 10, in which it will be seen that after the two blocks there shown are pushed together their serrated edges will match and leave a smooth surface carrying the tesserae. The serrated edges of the blocks 32 will preferably be bound with thin strips of sheet metal 92 for the protection of said edges, and consequently for the preservation of the pattern formed on the blocks.

In the operation of the apparatus made the subject of this application the tesserae 90 will be placed upon the pin-blocks 32 by hand or machinery in accordance with known methods, and the blocks 32 will one after another be applied upon the bed-plate 29 and table 30 of the press 25. When the first block 32 is inverted upon the canvas 26 and has attained its position below the platen 35 of the press 25, the operator will cause the descent of the platen 35 upon the pin-block thereunder for the purpose of exerting the requisite pressure for causing the tesserae then at the lower side of said block to firmly adhere to the canvas 26, and thereupon the attendant will place the second pattern or pin block 32 in inverted position upon the canvas 26, stretched across the feed-table 30, taking care to see that the edges of this second block match the serrations in the block then below the platen 35. The attendant will then elevate the platen 35 from the first block 32, and during this action the pin-roller 34 will feed the canvas 26 through the press 25 and cause the said second pin-block 32 to pass directly below the platen 35 and the first pin-block 32 to travel from below the said platen 35 and pass outward upon the table 31, the said first pin-block 32 having the tesserae stripped from it while passing the roller 34 by reason of the adherence of said tesserae to the canvas 26 and the pulling downward of the canvas 26 into the well 61 by the pins on said roller 34. The attendant will then cause the platen 35 on the press 25 to descend upon the said second pin-block 32 and effect the requisite pressure to cause the tesserae thereon to become firmly affixed to the canvas below it, and thereupon the attendant will place a third pin-block 32 in inverted position upon the table 30 and see that its serrated edges match the edges of the said second pin-block then below the platen 35, after which the platen 35 will be elevated from the said second pin-block, and the rotation of the roller 34 will draw the second pin-block from position below the said platen 35 and feed the said third pin-block to position below said platen, and thereupon, as before, the platen 35 will be lowered to effect the requisite pressure upon the said third block. This operation will be continued during any period of time, or so long as it may be desired to continue the manufacture of the floor-cloth, the attendant constantly supplying the pin-blocks 32 with the tesserae thereon to the feed-table 30 and upon each ascent of the platen 35 the roller 34 drawing the canvas and pin-blocks one after another first below the platen 35, where the pressure is applied, and then outward upon the table 31, from which table 31 the attendants will remove the empty pin-blocks 32 as often as may be required. After the pressure of the platen 35 has been applied upon the pin-block the tesseræ will adhere to both the pin-block and the canvas 26; but during the outward feeding of the pin-blocks 32 from the press 25 the pin-roller 34, engaging the interstices of the canvas 26, will strip the tesseræ from the pin-blocks, the said tesseræ adhering more firmly to the canvas 26 than to the pin-blocks. The canvas 26, carrying the tesseræ removed from the pin-blocks 32, will travel downward into the well 61 below the roller 89 and then upward over the roller 88 to the table 86, leading to the bed-plate 85 of the press 27, and will continue over the feed-plate 85 of said press 27 to and be wound upon the drum 28. During the passage of the canvas 26 with the tesseræ thereon over the bed-plate 85 of the press 27 the attendant at said press will by means of the heated platen 62 press the tesseræ upon the canvas, this last pressure completing the floor-cloth and causing the tesseræ to become effectually secured to the canvas and to have their edges united on well-defined lines. The final pressure exerted by the press 27 renders the tesseræ compact, smooth, and durable and capable of withstanding the uses to which floor-cloth are subjected. During the operation of the press 27 the apron 64 will from time to time be caused to travel below the platen 62, so as to present fresh surfaces to the tesseræ, and by reason of the fact that said apron 64 presents smooth uniform surfaces the upper surfaces of the tesseræ will have a finished appearance imparted to them during their passage through the press 27. The presses 25 27 will be operated as nearly as possible in harmony with one another, so that no considerable time shall elapse between the action of the press 25 on the tesseræ and the action of the press 27 thereon. The tesseræ placed upon the pin-blocks 32 will be in an unseasoned state or of a somewhat adherent spongy texture and will while in this condition be applied upon the canvas or foundation fabric 26, the tesseræ when in this condition being capable of being manufactured into a finished floor-cloth by the continuous process hereinbefore described.

In accordance with my present invention the floor-cloth may be very conveniently and rapidly and properly manufactured with a great saving of time and expense. The pin-blocks 32 will in length equal the canvas 26 in width, usually being about six feet in length, and the platens 35 62 will correspond with the surface area of the pin-blocks 32, and thus with each operation of the platens 35 36 a complete section (equal to the size of a pin-block 32) of floor-cloth is completed.

What I claim as my invention, and desire to secure by Letters Patent, is—

1. In a machine for making inlaid floor-cloth, the first press having the bed-plate and platen between which the foundation fabric passes and which are adapted to and to receive between them the pattern-blocks carrying the tesseræ for transference to said fabric by said press, and means for automatically stripping the tesseræ from said pattern-blocks after said press has caused the tesseræ to adhere to said fabric, whereby the tesseræ leave said blocks and remain attached to said fabric, combined with the second press through which said fabric with the tesseræ thereon thereupon passes and wherein it is subjected to heat and pressure for finishing the floor-cloth, and means for effecting the intermittent travel of said fabric through said presses; substantially as set forth.

2. In a machine for making inlaid floor-cloth, the press having the bed-plate over which the foundation fabric may travel, the platen for exerting the pressure to cause the tesseræ to adhere to said fabric, and means for operating said platen, combined with the pin-roller at the rear of said bed-plate for engaging and feeding the said fabric, and means for imparting an intermittent rotary motion to said roller; substantially as set forth.

3. In a machine for making inlaid floor-cloth, the first press having the heated bed and cold platen between which the foundation fabric is fed and which are adapted to and to receive between them the pattern-blocks carrying the tesseræ for transference to said fabric by said press, combined with the second press having the heated bed and heated platen between which the said fabric with the tesseræ thereon is fed and wherein it is subjected to heat and pressure for finishing the floor-cloth, and means for effecting the intermittent travel of said fabric through said presses; substantially as set forth.

4. In a machine for making inlaid floor-cloth, the press having the bed-plate over which the foundation fabric may travel, the platen for exerting the pressure to cause the tesseræ to adhere to said fabric, and means for operating said platen, combined with tables extending to the front and rear of said bed-plate beyond the vertical plane of the said platen, and adapted to receive the pattern-blocks used for carrying the tesseræ, and means for drawing said fabric through said press, said fabric on its movements through the press serving to carry one of said pattern-blocks from below the platen and the next following pattern-block to position below the platen; substantially as set forth.

5. In a machine for making inlaid floor-cloth, the press having the bed-plate over which the foundation fabric may travel, the platen for exerting the pressure to cause the tesseræ to adhere to said fabric, and means for operating said platen, combined with the pin-roller in rear of said bed-plate and over which said fabric travels and which causes the said fabric to turn downwardly as it is fed onward, the table in rear of said roller, and means for imparting intermittent rotary motion to said roller and through it to said fabric; substantially as set forth.

6. In a machine for making inlaid floor-cloth, the press having the bed-plate over which the foundation fabric may travel, the platen for exerting the pressure to cause the tesserae to adhere to said fabric, and means for operating said platen, combined with means at the rear of said bed-plate for engaging the said fabric and turning the same downward therefrom as it is fed onward, and the rear table, adapted to receive one after another the pattern-blocks used for carrying the tesserae, said means while turning said fabric downward serving to strip the tesserae from said pattern-blocks and move the latter upon said rear table; substantially as set forth.

7. In a machine for making inlaid floor-cloth, the press having the bed-plate over which the foundation fabric may travel, the platen for exerting the pressure to cause the tesserae to adhere to said fabric, and means for operating said platen, combined with means at the rear of said bed-plate for turning the said fabric downward as it feeds onward, said means while turning said fabric downward serving to strip the tesserae from the pattern-blocks; substantially as set forth.

8. In a machine for making inlaid floor-cloth, the press having the bed-plate over which the foundation fabric may travel, the platen for exerting the pressure to cause the tesserae to adhere to said fabric, and means for operating said platen, combined with the table at the rear of said bed-plate and between which and said bed-plate said fabric feeds downward, and means for feeding said fabric, said fabric with the tesserae thereon being stripped from said pattern-blocks as the fabric turns downward, while said blocks move onto said table; substantially as set forth.

9. In a machine for making inlaid floor-cloth, the press having the bed-plate over which the foundation fabric may travel, the platen for exerting the pressure to cause the tesserae to adhere to said fabric, and means for operating said platen, combined with the second press through which said fabric with the tesserae thereon travels and which subjects the same to further pressure, and the well intermediate said presses into which the fabric with the tesserae thereon is looped; substantially as set forth.

10. In a machine for making inlaid floor-cloth, the press having the bed-plate over which the foundation fabric may travel, the platen for exerting the pressure to cause the tesserae to adhere to said fabric, and means for operating said platen, combined with the second press through which said fabric with the tesserae thereon travels and which subjects the same to further pressure, the well intermediate said presses into which the fabric with the tesserae thereon is looped, and the tension-roller resting loosely within the loop of said fabric; substantially as set forth.

11. In a machine for making inlaid floor-cloth, the press having the bed-plate over which the foundation fabric may travel, the platen for exerting the pressure to cause the tesserae to adhere to said fabric, and means for operating said platen, combined with the second press through which said fabric with the tesserae thereon travels and which subjects the same to further pressure, the well intermediate said presses into which the fabric with the tesserae thereon is looped, the tension-roller resting loosely within the loop of said fabric, and the vertical guides for said roller; substantially as set forth.

12. In a machine for making inlaid floor-cloth, the first press having the bed-plate and platen between which the foundation fabric passes and which are adapted to and to receive between them the pattern-blocks which carry the tesserae for transference to said fabric under the action of said press, combined with the second press having the bed and platen between which said fabric with the tesserae thereon travels and therein is subjected to heat and pressure for finishing the floor-cloth, and means for effecting the intermittent travel of said fabric through said presses; substantially as set forth.

13. In a machine for making inlaid floor-cloth, the first press having the heated bed and cold platen between which the foundation fabric is fed, and by means of which platen the tesserae are caused to adhere to said fabric, combined with the second press having the heated bed and heated platen between which the said fabric with the tesserae thereon is fed to receive finishing pressure therefrom, and a smooth sheet carried below the platen of said second press; substantially as set forth.

Signed at New York, in the county of New York and State of New York, this 22d day of October, A. D. 1901.

DAVID NEILSON MELVIN.

Witnesses:
CHAS. C. GILL,
GUNDER GUNDERSON.